(12) United States Patent
Zhang et al.

(10) Patent No.: US 11,089,583 B2
(45) Date of Patent: Aug. 10, 2021

(54) METHOD AND USER EQUIPMENT FOR TRANSMITTING UPLINK SIGNALS

(71) Applicant: Samsung Electronics Co., Ltd., Gyeonggi-do (KR)

(72) Inventors: Shichang Zhang, Beijing (CN); Yi Wang, Beijing (CN); Yingyang Li, Beijing (CN)

(73) Assignee: Samsung Electronics Co., Ltd

( * ) Notice: Subject to any disclaimer, the term of this patent is extended or adjusted under 35 U.S.C. 154(b) by 187 days.

(21) Appl. No.: 16/301,368

(22) PCT Filed: May 8, 2017

(86) PCT No.: PCT/KR2017/004762
§ 371 (c)(1),
(2) Date: Nov. 13, 2018

(87) PCT Pub. No.: WO2017/196041
PCT Pub. Date: Nov. 16, 2017

(65) Prior Publication Data
US 2020/0267694 A1    Aug. 20, 2020

(30) Foreign Application Priority Data

May 12, 2016 (CN) .......................... 201610319433.2
May 26, 2016 (CN) .......................... 201610363478.X

(51) Int. Cl.
*H04W 72/04* (2009.01)
*H04W 74/08* (2009.01)

(52) U.S. Cl.
CPC ..... *H04W 72/042* (2013.01); *H04W 74/0808* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2011/0164579 A1    7/2011    Ishii et al.
2012/0002576 A1    1/2012    Zhang et al.
(Continued)

FOREIGN PATENT DOCUMENTS

CN    101547022    9/2009
CN    102378383    3/2012
(Continued)

OTHER PUBLICATIONS

3GPP TSG RAN WG1 Meeting # 84 bis, R1-162784, Busan, Korea, Apr. 11-15, 2016, Agenda item 7.3.1.1, Source: Nokia, Allcatel-Lucent Shanghai Bell, Title: On LAA UL Scheduling and UL grant enhancements. (Year: 2016).*
(Continued)

*Primary Examiner* — Peter G Solinsky
*Assistant Examiner* — Sanjay K Dewan
(74) *Attorney, Agent, or Firm* — The Farrell Law Firm, P.C.

(57) ABSTRACT

The present disclosure provides an uplink signal transmission method, user equipment (UE) and base station. When the UE transmits uplink signals in an unlicensed frequency band after receiving uplink synchronization command information, the UE transmits one or more uplink signals according to a predefined time or a time indicated by the base station. The UE determines mapping of an uplink signal according to the predefined time or the indicated time. When provided with the present disclosure, interference between signals of a same type or between signals of different types can be reduced and a signal transmission probability can be improved accordingly.

20 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0135984 A1 | 5/2013 | Choi et al. | |
| 2013/0201941 A1 | 8/2013 | Classon et al. | |
| 2014/0112283 A1 | 4/2014 | Kim et al. | |
| 2015/0245347 A1* | 8/2015 | Yi | H04W 72/0446 370/280 |
| 2015/0341914 A1* | 11/2015 | Lee | H04W 72/0453 370/329 |
| 2016/0014805 A1 | 1/2016 | Merlin et al. | |
| 2016/0242150 A1 | 8/2016 | Kang et al. | |
| 2016/0295576 A1* | 10/2016 | Dinan | H04L 5/001 |
| 2016/0295600 A1* | 10/2016 | Dinan | H04W 72/121 |
| 2016/0330011 A1 | 11/2016 | Lee et al. | |
| 2017/0086172 A1* | 3/2017 | Dinan | H04L 5/0053 |
| 2017/0215157 A1* | 7/2017 | Yang | H04W 16/14 |
| 2017/0251497 A1 | 8/2017 | Larsson et al. | |
| 2017/0289869 A1* | 10/2017 | Nogami | H04W 36/08 |
| 2017/0325225 A1* | 11/2017 | Dinan | H04W 72/0446 |
| 2018/0191547 A1* | 7/2018 | Mukherjee | H04W 72/0446 |
| 2018/0302913 A1* | 10/2018 | Yin | H04W 72/1294 |
| 2018/0324604 A1* | 11/2018 | Yang | H04L 5/001 |
| 2019/0081765 A1* | 3/2019 | Si | H04W 72/0453 |
| 2019/0110305 A1* | 4/2019 | Ookubo | H04W 28/24 |
| 2019/0150170 A1* | 5/2019 | Park | H04W 74/00 370/329 |
| 2019/0173546 A1* | 6/2019 | Kim | H04L 5/0051 |
| 2019/0208519 A1* | 7/2019 | Parkvall | H04L 27/2602 |
| 2019/0274138 A1* | 9/2019 | Zhang | H04W 74/0833 |
| 2019/0394792 A1* | 12/2019 | Jeon | H04W 16/14 |
| 2019/0394798 A1* | 12/2019 | Tomeba | H04W 74/006 |
| 2021/0007149 A1* | 1/2021 | Li | H04W 74/0833 |

FOREIGN PATENT DOCUMENTS

| | | |
|---|---|---|
| CN | 103354662 | 10/2013 |
| KR | 1020010028292 | 4/2001 |
| KR | 1020110125671 | 11/2011 |
| KR | 1020130058589 | 6/2013 |
| KR | 1020140022071 | 2/2014 |
| KR | 1020150034584 | 4/2015 |
| WO | WO 2015094914 | 6/2015 |
| WO | WO 2016048227 | 3/2016 |

OTHER PUBLICATIONS

3GPP TSG RAN WG1 Meeting #81, R1-152923, Fukuoka, Japan May 25-29, 2015, Source: Panasonic, Title: Discussion on UL transmission LAA, Agenda Item: 6.2.4.3, Document for: Discussion and decision. (Year: 2015).*

Nokia et al., "On LAA UL Scheduling and UL Grant Enhancements", R1-162784, 3GPP TSG RAN WG1 Meeting #84bis, Apr. 11-15, 2016, 9 pages.

InterDigital Communications, "UL Channel Access for eLAA", R1-162913, 3GPP TSG-RAN WG1 Meeting #84bis, Apr. 11-15, 2016, 4 pages.

Ericsson, "DCI for Short TTI Uplink Transmissions", R1-160938, 3GPP TSG RAN WG1 Meeting #84, Feb. 15-19, 2016, 7 pages.

Fujitsu, "UL LBT and PUSCH Design for LAA", R1-160489, 3GPP TSG RAN WG1 Meeting #84, Feb. 15-19, 2016, 6 pages.

Nokia Networks et al., "On LAA PUSCH Scheduliing and UL Grant Enhancements", R1-160788, 3GPP TSG RAN WG1 Meeting #84, Feb. 15-19, 2016, 6 pages.

Panasonic, "Discussion on UL Transmission in LAA", R1-152923, 3GPP TSG RAN WG1 Meeting #81, May 25-29, 2015, 3 pages.

European Search Report dated Feb. 27, 2019 issued in counterpart application No. 17796341.0-1215, 12 pages.

PCT/ISA/210 Search Report issued on PCT/KR2017/004762 (pp. 3).

PCT/ISA/237 Written Opinion issued on PCT/KR2017/004762 (pp. 7).

Samsung, 3GPP TSG RAN WG1 Meeting #84, R1-160570, St Julian's, Malta, Feb. 15-19, 2016, Discussion on enhanced Cat 2-based UL LBT, pp. 7.

NTT Docomo, Inc., #GPP TSG RAN WG1 Meeting #84bis, R1-162799, Busan, Korea, Apr. 11-15, 2016, Discussion on PUSCH design for eLAA UL, pp. 6.

ZTE Microelectronics Technology, Nubia Technology, 3GPP TSG RAN WG1 Meeting #84bis, R1-162326, Busan, Korea Apr. 11-15, 2016, PRACH Design for LAA, pp. 9.

Korean Office Action dated Dec. 8, 2020 issued in counterpart application No. 10-2018-7032618, 8 pages.

Chinese Office Action dated Apr. 27, 2021 issued in counterpart application 201610363478.X, 20 pages.

Korean Office Action dated Jun. 27, 2021 issued in counterpart application No. 10-2018-7032618, 4 pages.

* cited by examiner

[Fig. 1]
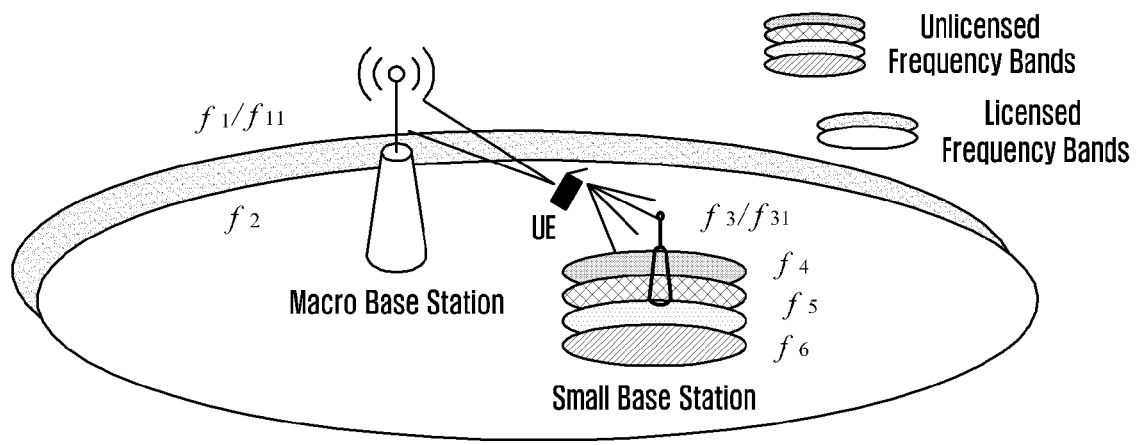
[Fig. 2]
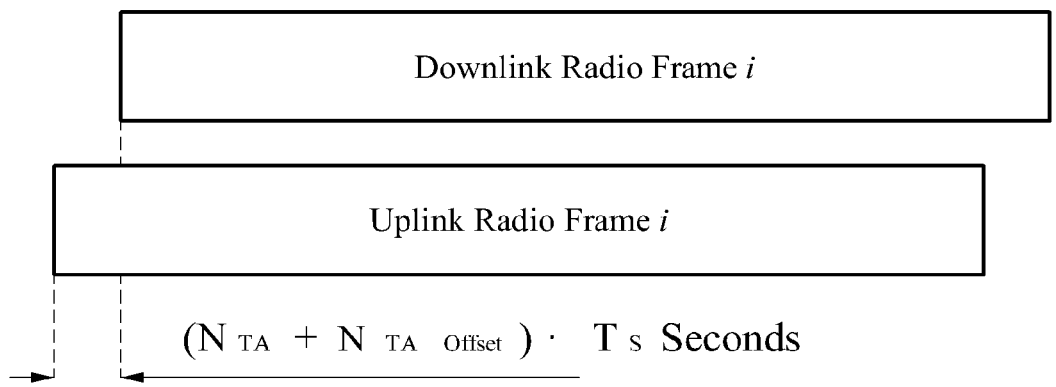

[Fig. 3]
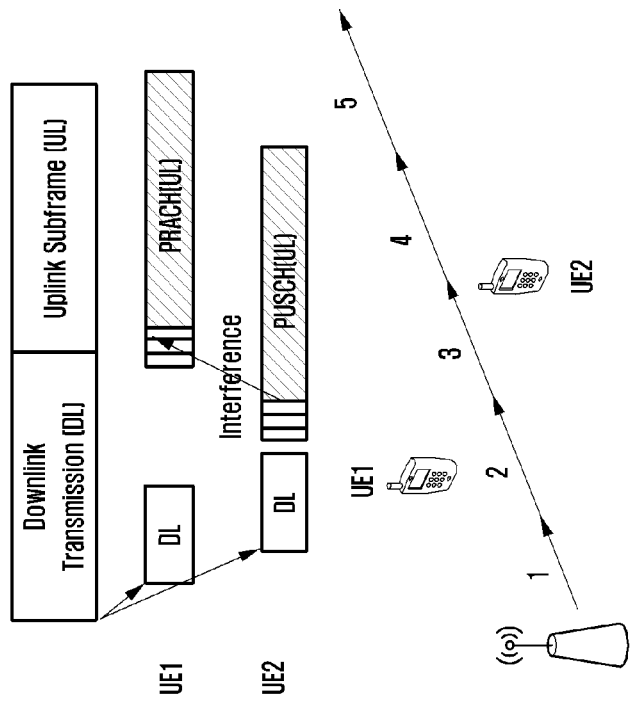
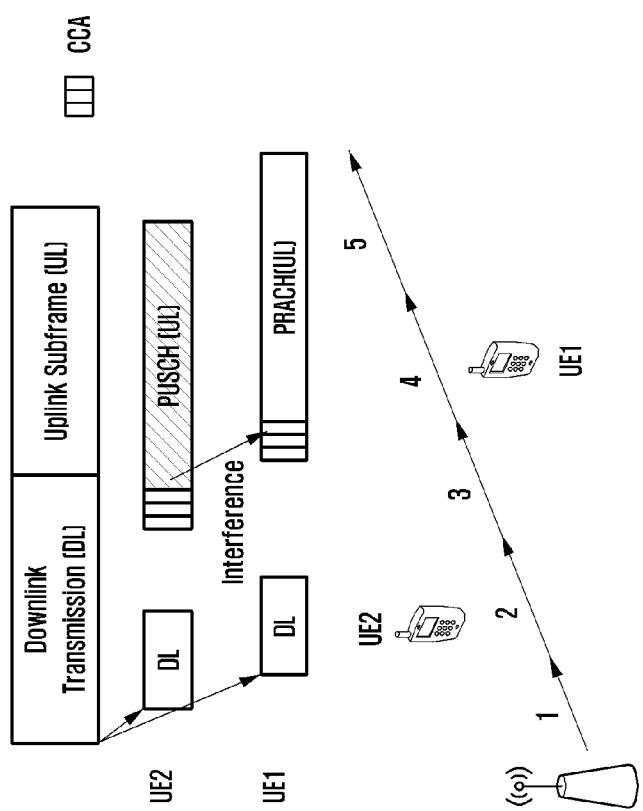

[Fig. 4]
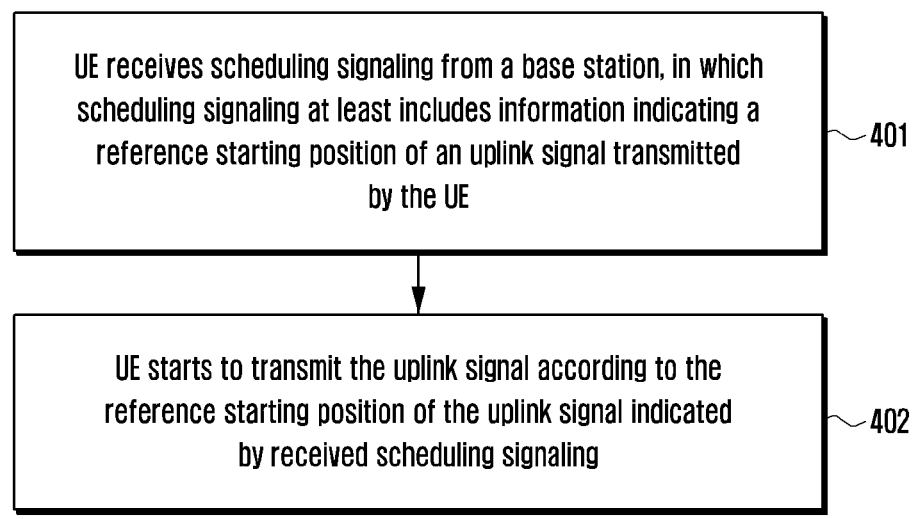

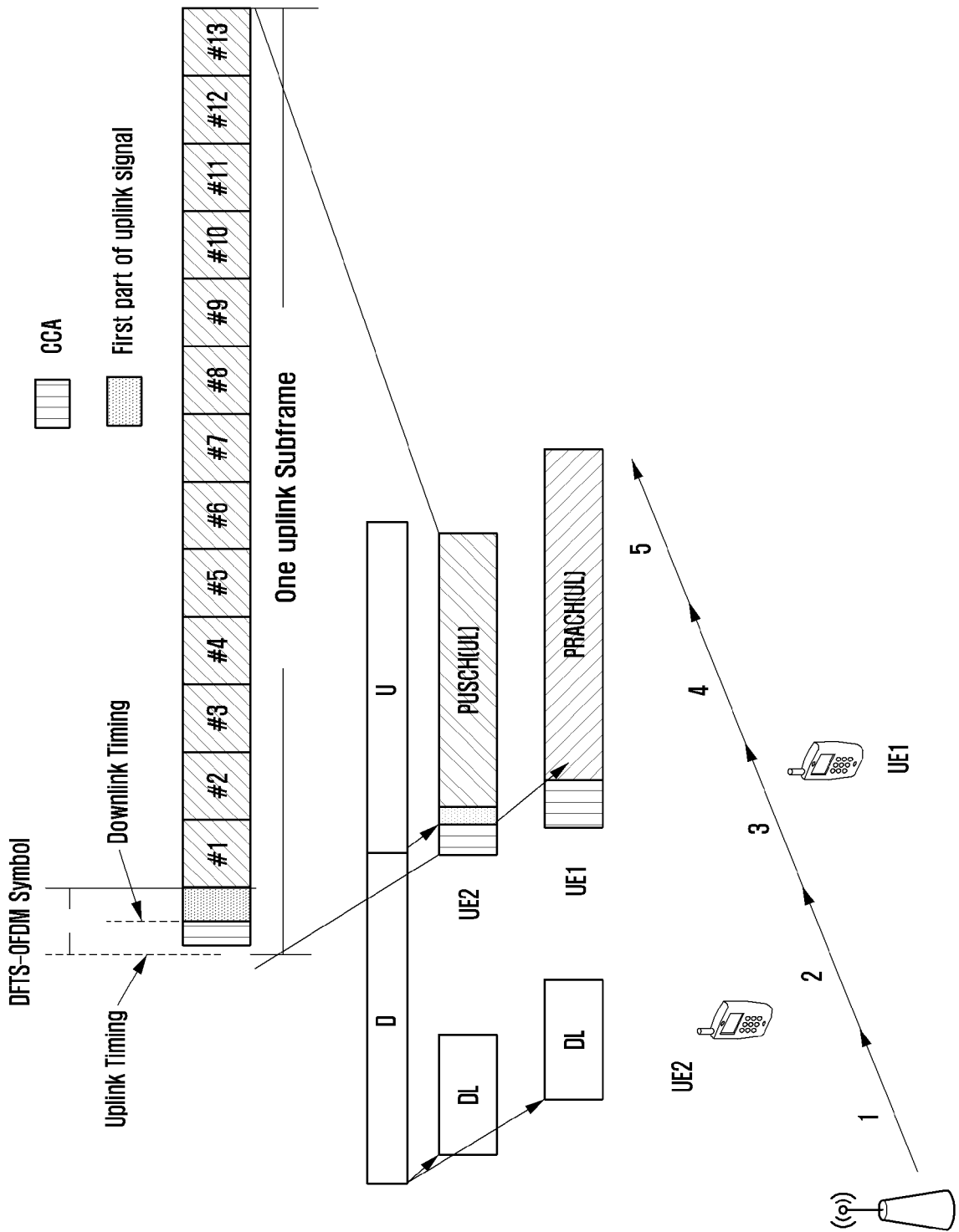
[Fig. 5]

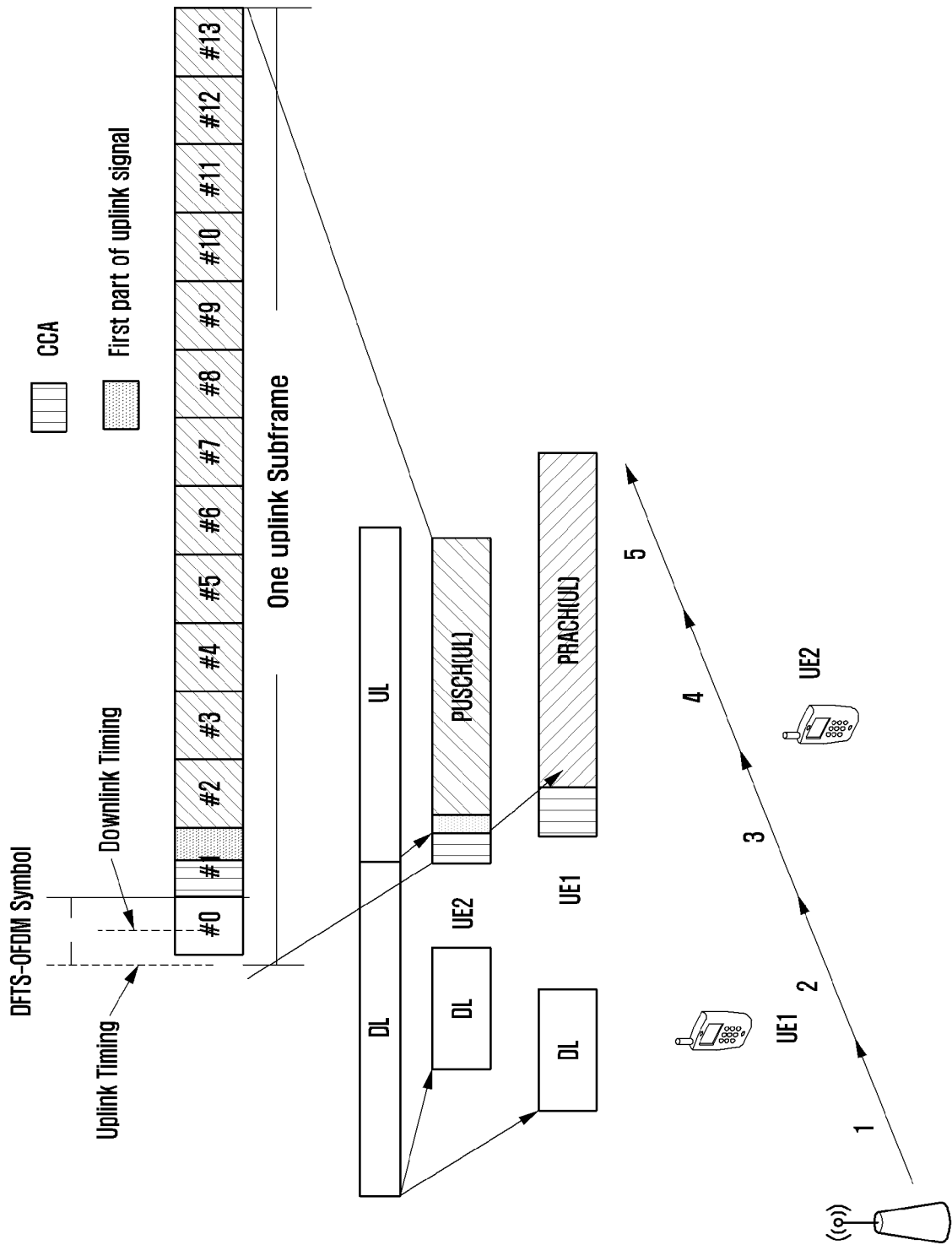
[Fig. 6]

[Fig. 7]
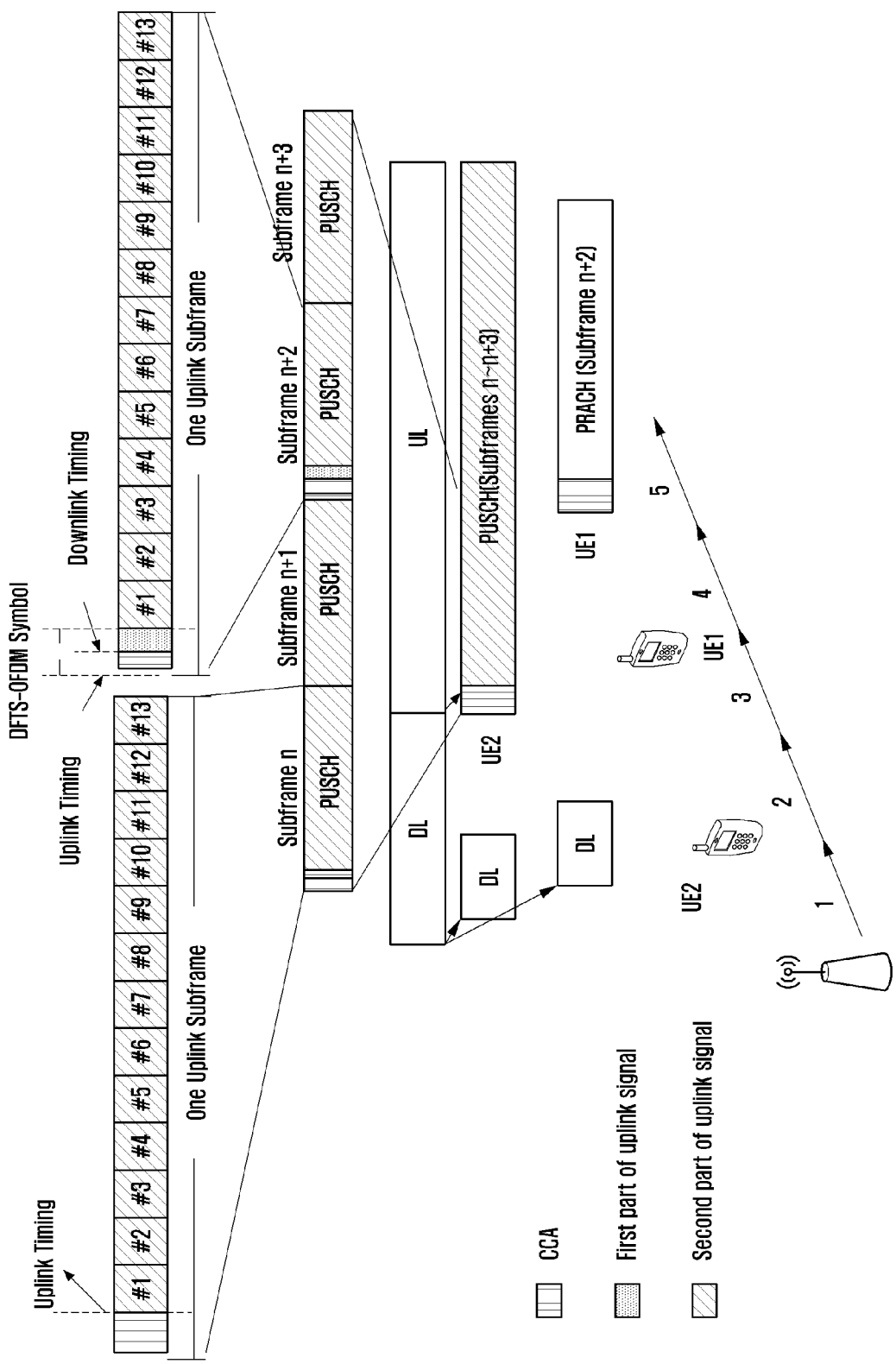

[Fig. 8]
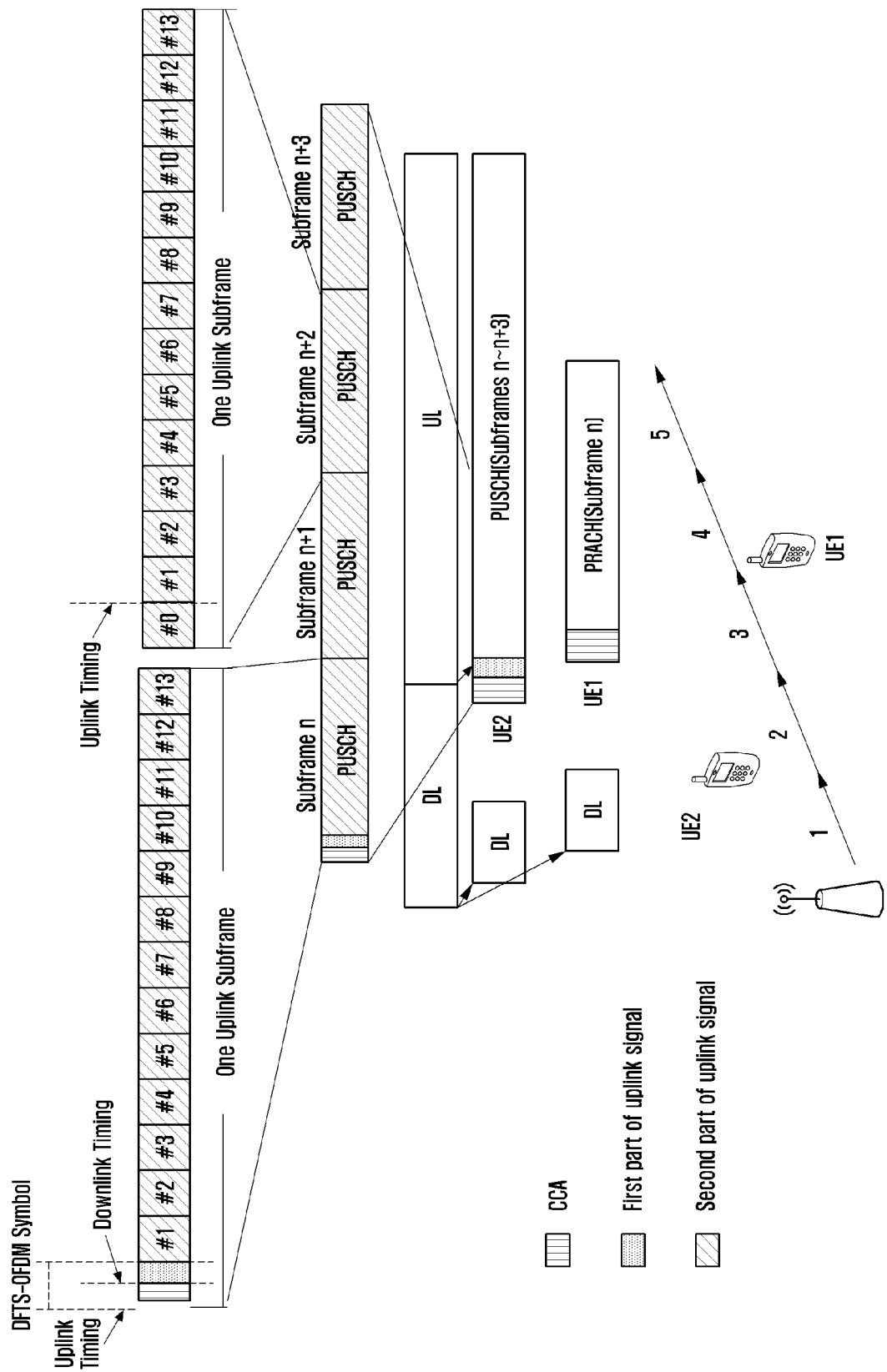

[Fig. 9]
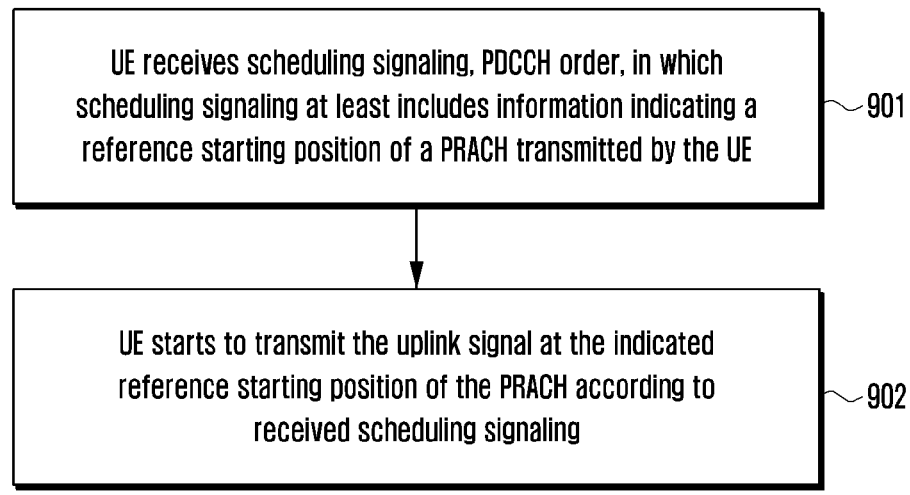
[Fig. 10]
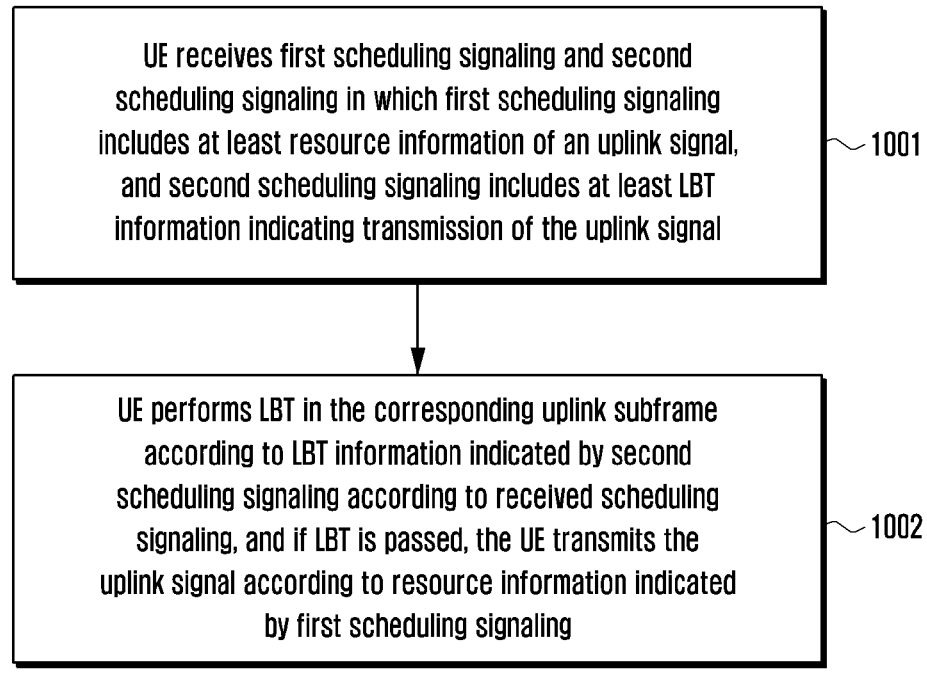
[Fig. 11]
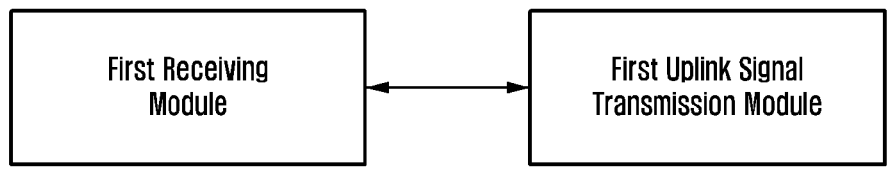

[Fig. 12]
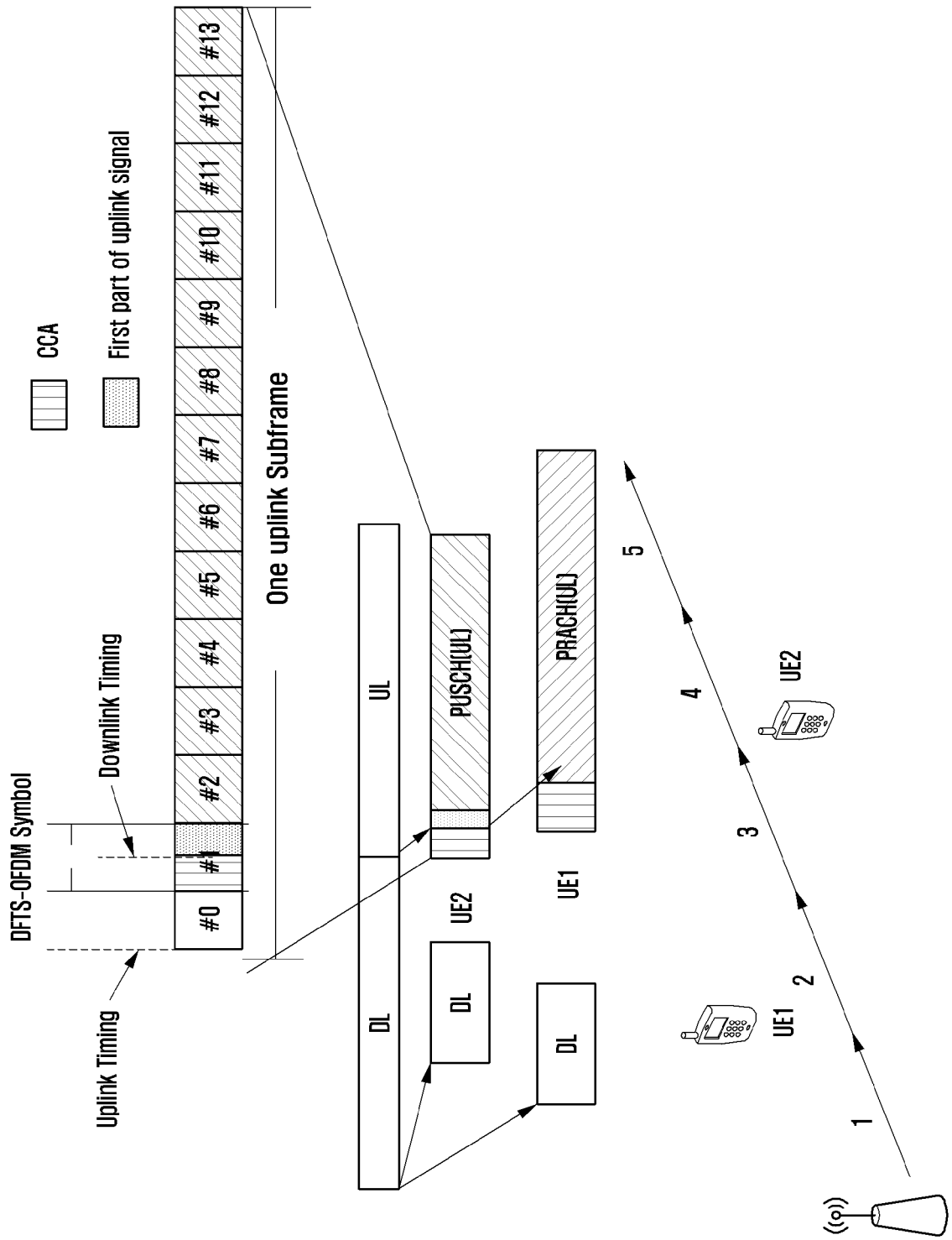

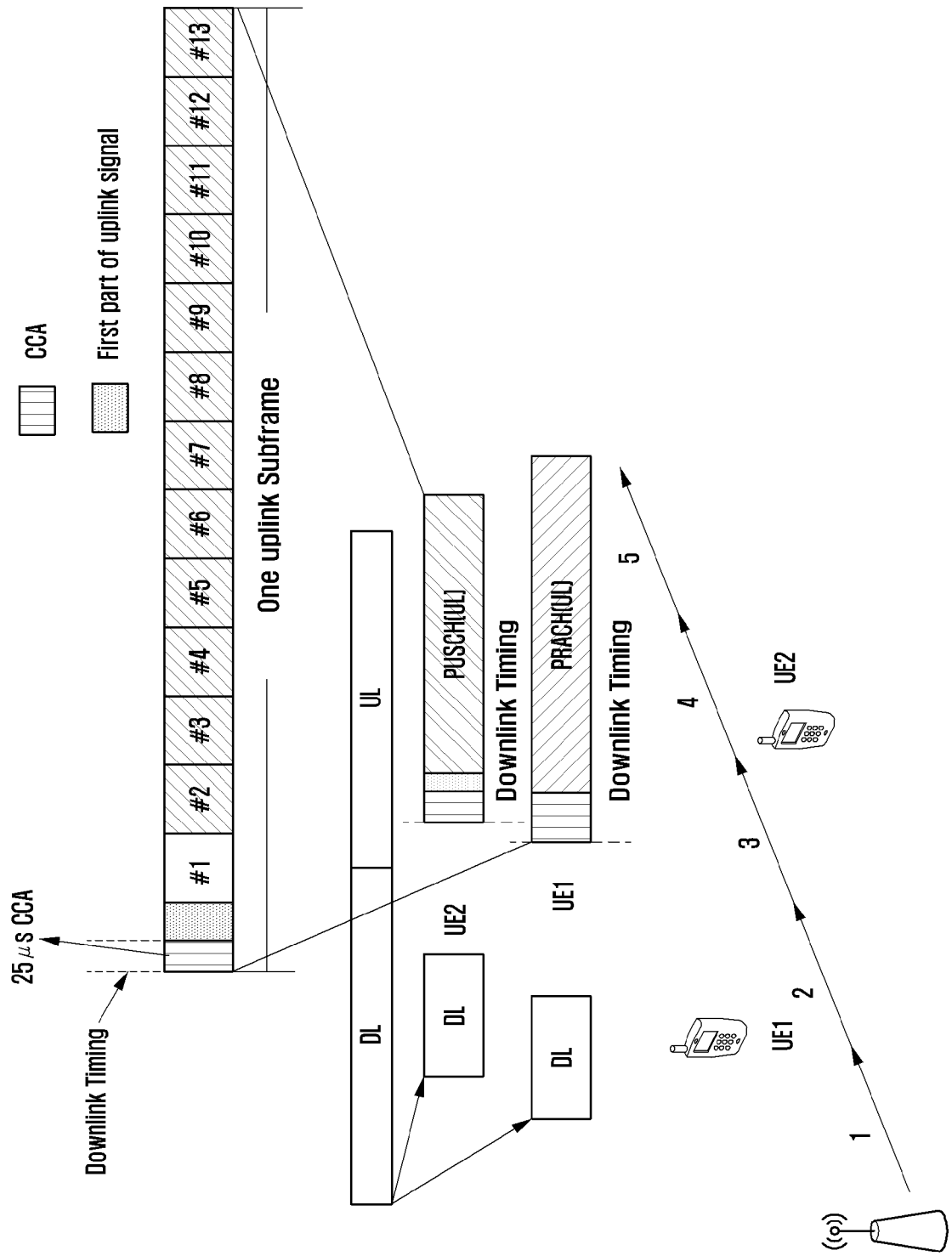
[Fig. 13]

METHOD AND USER EQUIPMENT FOR TRANSMITTING UPLINK SIGNALS

PRIORITY

This application is a National Phase Entry of PCT International Application No. PCT/KR2017/004762 which was filed on May 8, 2017, and claims priority to Chinese Patent Application Nos. 201610319433.2 and 201610363478.X, which were filed on May 12, 2016 and May 26, 2016, respectively, the content of each of which is incorporated herein by reference.

TECHNICAL FIELD

The present disclosure relates to mobile communications, and particularly to a method and user equipment for transmitting uplink signals.

BACKGROUND ART

With the conflict between the demand of users for high-bandwidth wireless services and the scarcity of spectrum resources becoming increasingly severe, mobile operators are beginning to consider unlicensed frequency bands as a supplement to licensed frequency bands. Therefore, the research on deployment of long term evolution (LTE) in the unlicensed frequency bands has been put on the agenda. The 3rd generation partnership project (3GPP) has begun to study an effective carrier aggregation of the unlicensed frequency bands and the licensed frequency bands, as shown in FIG. 1, and how to effectively improve the spectrum utilization of the whole network without significantly affecting other technologies in the unlicensed frequency bands is a technical problem urgently to be solved.

The unlicensed frequency bands are usually allocated for some other purpose, such as radar or 802.11 series of wireless fidelity (WiFi). As a result, because interference between the unlicensed frequency bands is indefinite, the quality of service (QoS) of LTE transmissions is often difficult to guarantee. However, the unlicensed frequency bands still can be used for data transmission with low QoS requirements. Here, an LTE system deployed in an unlicensed frequency band is referred to as a licensed assisted access (LAA) system. In the unlicensed frequency band, how to avoid mutual interference between the LAA system and other wireless systems such as radar or WiFi is a key issue.

Clear Channel Assessment (CCA) is a mechanism to avoid collision commonly used in the unlicensed frequency bands. A mobile station (STA) must detect a radio channel before sending a signal, and the STA can only send the signal over the radio channel when it detects that the radio channel is idle. LAA also needs to follow a similar mechanism to ensure less interference with other signals. A simple method is that a LAA device (base station or user equipment) dynamically switches according to a CCA result, namely, performing transmission when a channel is idle or not performing transmission when a channel is busy.

In a traditional LTE system, a random access procedure may be performed on a primary cell (Pcell) or on a secondary cell (Scell). The purpose of performing the random access procedure on the Pcell is to enable a UE to establish an initial connection from a RRC_IDLE state, or for a radio resource control (RRC) connection reestablishment of the UE, or for a cell handover, or for a situation where there is an uplink out-of-synchronization but a downlink service arrives or an uplink service arrives when the UE in an RRC connection state, or for positioning of the UE in the RRC connection state. The random access procedure performed on the Scell is used to establish uplink synchronization on a corresponding sTAG. In a LAA system, an unlicensed frequency band carrier can only be used for a Scell. A random access procedure may be performed on a LAA Scell to establish uplink synchronization on a corresponding sTAG, as shown in FIG. 1. The random access procedure is based on non-contention. A non-contention-based random access procedure includes the following three steps:

Step 1: a base station allocates a random access preamble through downlink signaling.

The base station allocates a non-contention random access preamble for a UE.

Downlink signaling may be carried by a physical downlink control channel (PDCCH) (PDCCH order) or may be carried by other higher layer signaling.

The PDCCH order may include a physical random access channel (PRACH) preamble index and a PRACH mask index.

Step 2: the UE transmits the random access preamble on a PRACH channel.

The random access preamble transmitted by the UE is transmitted according to a codeword sequence and a time-frequency resource indicated by downlink signaling received in step 1.

The UE transmits the random access preamble over a PRACH channel on one and/or more uplink carriers scheduled by the PDCCH order on the first PRACH resource subframe which is X milliseconds (e.g., 6 ms) after the UE receives the PDCCH order. That is, assuming that the UE receives the PDCCH order in subframe n, then the UE transmits a PRACH in the first PRACH resource subframe counted from subframe n+k (k>=6). A time resource for the PRACH may be configured by a higher layer, e.g., RRC, or may be instructed by physical layer signaling.

Step 3: the base station transmits a random access response carried by a physical downlink shared channel (PDSCH).

The UE receives the random access response within a random access response window. If the UE does not receive the random access response within the random access response window, then the UE prepares to retransmit a PRACH in Y milliseconds (e.g., 4 ms) after the end of the random access response window.

In a LAA system, a base station triggers a UE to transmit a PRACH/PRACHs on one or more LAA Scells, and the UE usually needs to perform CCA detection on a corresponding LAA Scell. A PRACH preamble sequence can be transmitted on a LAA Scell if and only if CCA detection on the LAA cell is passed. A time to transmit the PRACH preamble sequence is determined according to a downlink time (DL timing) of the corresponding LAA Scell. Since a channel of the corresponding LAA Scell may be occupied so that the UE cannot perform uplink transmission, an increase in uplink synchronization delay may be caused. The channel of the LAA Scell may be occupied by other systems, such as WiFi, or may be occupied by other devices in the LAA system. For example, for different UEs served by the same eNB, in the same uplink subframe, a UE1 may transmit a physical uplink shared channel (PUSCH) and a UE2 may transmit a PRACH preamble. Since the UE1 has already established uplink synchronization, it transmits the PUSCH according to an uplink time (UL timing). UL timing may be understood simply as being determined based on DL timing, according to a timing advance $N_{TA}$ and an offset $N_{TAoffset}$ indicated by the base station, as shown in FIG. 2. In some cases, as shown in FIG. 3, when the UE2 performs CCA detection, it may detect the PUSCH transmitted by the UE1, but since the UE2 cannot identify a signal of the UE1, so the UE2 can only find the channel is busy and cannot pass CCA detection. To enable UEs of the same cell to transmit simultaneously in the same subframe, there is a need for a CCA detection method to prevent different UEs from interfering with each other.

It is to be noted that the introduction of the technical background is intended to illustrate the technical scheme of the present disclosure clearly and completely and to facilitate understanding by those skilled in the art. These technical schemes should not be considered to be known by those skilled in the art just because they are described in the background part.

DISCLOSURE OF INVENTION

Technical Problem

A channel of the corresponding LAA Scell may be occupied so that the UE cannot perform uplink transmission, an increase in uplink synchronization delay may be caused. The channel of the LAA Scell may be occupied by other systems, such as WiFi, or may be occupied by other devices in the LAA system.

Solution to Problem

The present disclosure provides a method for transmitting an uplink signal, including:

receiving, by a user equipment (UE), scheduling signaling, in which scheduling signaling at least includes information indicating a reference starting position of an uplink signal transmitted by the UE; and starting to transmit the uplink signal, by the UE, on a corresponding uplink carrier according to the reference starting position of the uplink signal indicated by received scheduling signaling.

Preferably, scheduling signaling is user-specific control signaling, and/or scheduling signaling is cell common control signaling.

Preferably, the indicated reference starting position of the uplink signal includes one of the following:

downlink timing (DL timing) or uplink timing (UL timing);

DL timing or UL timing of an indicated timing advance group (TAG); and

DL timing or timing advance (TA) information indicated by scheduling signaling.

Preferably, the indicated reference starting position of the uplink signal includes one of the following:

a combination of DL timing and a transmission timing offset Y;

a combination of UL timing and the transmission timing offset Y;

a combination of DL timing or TA information indicated by scheduling signaling and the transmission timing offset Y; and preferably, the transmission timing offset Y may be indicated by N bits. For example, N=2, indicates Y=0 us, 16 us, 25 us, and a length of 2 symbols respectively.

Preferably, the transmission timing offset Y may be predefined by a system or indicated by a base station.

Preferably, for a PUSCH and a PRACH, indicated reference starting positions of uplink signals thereof may be indicated separately.

Preferably, the reference starting position is indicated in an explicit way, or the reference starting position is indicated by information indicating a symbol where a starting position of the uplink signal is located.

Preferably, in a case where the reference starting position is indicated by information indicating a starting position of the uplink signal, if the starting position of the uplink signal indicated is located within a single carrier frequency division multiple access (SC-FDMA) symbol, the UE determines the starting position of the uplink signal according to a combination of DL timing and/or a transmission timing offset Y, and if the starting position of the uplink signal indicated is located at an edge of the SC-FDMA symbol, then the UE determines the starting position of the uplink signal according to UL timing.

Preferably, if the indicated reference starting position of the uplink signal is a combination of DL timing and/or a transmission timing offset Y, then the uplink signal transmitted by the UE includes two parts of signal, in which a first part of signal is a signal to occupy a channel and a second part of signal is a signal bearing information.

Preferably, a starting position of an uplink subframe where the uplink signal transmitted by the UE is located is determined according to UL timing; in which in the uplink subframe, a starting position of the first part of signal is at a starting position of a combination of DL timing and/or the transmission timing offset Y within # X SC-FDMA symbol, and an ending position of the first part of signal is at a starting position of # X+1 SC-FDMA symbol determined according to UL timing, and the ending position of the first part of signal is earlier than a starting position of the second part of signal; the starting position of the second part of signal is the starting position of the # X+1 SC-FDMA symbol determined according to UL timing, and an ending position of the second part of signal is an ending position of the uplink subframe; there is no signal transmission between the starting position of the uplink subframe and the starting position of the first part of signal; where # X is a non-negative integer.

Preferably, the UE performs CCA before the starting position of the first part of signal on an uplink carrier of which the UL signal is transmitted to determine whether the uplink carrier is idle; and if the uplink carrier is idle, then the UE starts to transmit the first part of signal and the following second part of signal at DL timing, and if the uplink carrier is busy, then the UE does not transmit the uplink signal.

Preferably, if the UE is configured with multi-subframe scheduling, then the indicated reference starting position of the uplink signal applies to an uplink signal which is transmitted by the UE in a first uplink subframe of a plurality of uplink subframes scheduled.

Preferably, if the indicated reference starting position of the uplink signal is a combination of DL timing and/or a transmission timing offset Y, then the uplink signal transmitted by the UE in the first uplink subframe of the plurality of uplink subframes scheduled includes two parts of signal, in which a first part of signal is a signal to occupy a channel, a second part of signal is a signal bearing useful information, a starting position of the first part of signal is determined according to the combination of DL timing and the transmission timing offset Y, and a starting position of the second part of signal is determined according to UL timing; and uplink signals transmitted in other uplink subframes of the plurality of uplink subframes scheduled only include the second part of signal, and a time to transmit the second part of signal is determined according to UL timing.

Preferably, if the UE is configured with multi-subframe scheduling, then the indicated reference starting position of the uplink signal applies to an uplink signal which is transmitted in a physical random access channel (PRACH) uplink subframe of a plurality of uplink subframes scheduled.

Preferably, if the indicated reference starting position of the uplink signal includes a combination of DL timing and/or a transmission timing offset Y, then the uplink signal transmitted by the UE in the PRACH uplink subframe of the plurality of uplink subframes scheduled includes two parts of signal, in which a first part of signal is a signal to occupy a channel, a second part of signal is a signal bearing useful information, a starting position of the first part of signal is determined according to the combination of DL timing and the transmission timing offset Y, and a starting position of the second part of signal is determined according to UL timing; and uplink signals transmitted in other uplink subframes of the plurality of uplink subframes scheduled except for the PRACH uplink subframe only include the second part of signal, and a time to transmit the second part of signal is determined according to UL timing.

The present disclosure also discloses a user equipment, including:

a first receiving module to receive scheduling signaling, in which scheduling signaling at least includes information indicating a reference starting position of an uplink signal transmitted by the UE; and a first uplink signal transmission module to start to transmit the uplink signal on a corresponding uplink carrier according to the reference starting position of the uplink signal indicated by received scheduling signaling.

Advantageous Effects of Invention

The present disclosure provides a method and user equipment for transmitting uplink signals, which can effectively reduce the problem of mutual interference between CCA detection of UEs due to non-synchronization of times when the uplink signals are transmitted, and thus, an overall network efficiency is improved.

BRIEF DESCRIPTION OF DRAWINGS

FIG. 1 is a schematic diagram illustrating a LAA system where licensed frequency bands and non-licensed frequency bands belong to different timing advance groups (TAGs);

FIG. 2 is a schematic diagram illustrating a relationship of downlink timing and uplink timing (DL timing, UL timing) in a traditional system;

FIG. 3 is a schematic diagram illustrating interference which may happen between UEs in a LAA system;

FIG. 4 is a flowchart of a PUSCH transmission method in Embodiment 1 of the present disclosure;

FIG. 5 is a schematic diagram of transmitting a PUSCH according to a downlink transmission time indicated in Embodiment 1 of the present disclosure;

FIG. 6 is another schematic diagram of transmitting a PUSCH according to a downlink transmission time indicated in Embodiment 1 of the present disclosure;

FIG. 7 is a schematic diagram of transmitting a PUSCH by a multi-subframe-scheduled UE according to an indicated downlink transmission time in Embodiment 1 of the present disclosure;

FIG. 8 is another schematic diagram of transmitting a PUSCH by a multi-subframe-scheduled UE according to an indicated downlink transmission time in Embodiment 1 of the present disclosure;

FIG. 9 is a flowchart of a PRACH transmission method in Embodiment 2 of the present disclosure;

FIG. 10 is a flowchart of an uplink signal transmission method in Embodiment 3 of the present disclosure;

FIG. 11 is a schematic diagram of a structure of a UE according to the present disclosure;

FIG. 12 is a schematic diagram of transmitting a PUSCH according to an indicated downlink transmission time in Embodiment 1 of the present disclosure; and FIG. 13 is a schematic diagram of transmitting a PRACH according to an indicated downlink transmission time in Embodiment 2 of the present disclosure.

MODE FOR THE INVENTION

To solve the problems in traditional art, the present disclosure provides several uplink signal transmission methods, user equipments and base stations. To be more specific, the present disclosure provides a PUSCH and/or physical uplink control channel (PUCCH) and/or sounding reference signal (SRS) transmission method, user equipment and base station, and a PRACH transmission method, user equipment and base station. To facilitate description, only PUSCH and PRACH transmission methods are described in the following.

Embodiment 1

FIG. 4 is a flowchart of a PUSCH transmission method in Embodiment 1 of the present disclosure. The PUSCH transmission method includes the following steps:

Step 401: a UE receives scheduling signaling from a base station, in which scheduling signaling at least includes information indicating a reference starting position of an uplink signal transmitted by the UE.

Preferably, scheduling signaling is uplink transmission scheduling signaling, UL grant. The UL grant is UE-specific signaling.

Preferably, scheduling signaling may also include cell common cell-specific signaling. For example, cell common cell-specific signaling may indicate parameters or physical channel mapping information relating to uplink transmission for all UEs in one or more subframes. Then for all UEs which detect this cell common cell-specific signaling, if they are going to transmit uplink signals in corresponding uplink subframes, they need to process the uplink signals according to this cell common cell-specific signaling.

Preferably, scheduling signaling may also include user group common signaling.

Preferably, information indicating the reference starting position of the uplink signal transmitted by the UE may indicate whether a time at which the UE transmits the uplink signal is according to UL timing or DL timing. DL timing may be understood as starting at UL timing and being delayed by timing advance (TA) microseconds backward, where TA is configured by the base station and/or autonomously adjusted by the UE, which case is simplified as DL timing for the convenience of description.

Further, information indicating the reference starting position of the uplink signal transmitted by the UE may further include a transmission timing offset Y. The UE may determine the reference starting position of the uplink signal according to DL timing or UL timing and the transmission timing offset Y.

Preferably, information indicating the reference starting position of the uplink signal transmitted by the UE may be explicit or implicit. Preferably, explicit information may be a single bit. For example, 1-bit information, "0" indicates UL timing, and "1" indicates DL timing. Preferably, implicit information may be information indicating an SC-FDMA symbol within which a starting position of the uplink signal is located. For example, there are 2 bits indicating whether the starting position of the uplink signal is a starting position of #0 SC-FDMA symbol, or a starting position of #1 SC-FDMA symbol, or within the #0 SC-FDMA symbol, or within the #1 SC-FDMA symbol. If in a certain symbol is indicated, then it can be understood that the starting position of the uplink signal is determined according to DL timing in the symbol. If a starting position of a certain symbol is indicated, it can be understood that the starting position of the uplink signal is determined according to UL timing. As another example, implicit information may indicate whether to transmit a signal to occupy a channel. If it is indicated that the signal to occupy the channel can be transmitted, it means according to DL timing, and if it is indicated that the signal to occupy the channel cannot be transmitted, it means according to UL timing. As another example, when information indicating the reference starting position may include the transmission timing offset Y, 2-bit information is used, in which "0" means starting from #0 according to the UL timing, "1" means starting from DL timing+16 us (Y=16), "2" means starting from DL Timing+25 us (Y=25), and "3" means starting from #1 of the UL timing. Among them, as the reference starting position, DL timing+25 us not only enables the UE to perform 25 us CCA and transmit the uplink data after an immediately subsequent entire downlink subframe ends, but also enables coexistence with a PRACH UE in the subframe.

Step 402: The UE starts to transmit the uplink signal according to the reference starting position of the uplink signal indicated by received scheduling signaling.

Preferably, if the indicated reference starting position of the uplink signal indicates DL timing and/or the transmission timing offset Y, the uplink signal transmitted by the UE may include two parts of signal. Among them, the first part of signal is a signal to occupy a channel and the second part of signal is a PUSCH. The signal to occupy the channel may be a signal that is not defined by the standard, or may be a specific signal defined by the standard, such as a special sequence, or a part of time-domain signal of a current PUSCH or next PUSCH symbol. For example, if the length of the first part of signal is L us, where L is less than the length of one SC-FDMA, then the first part of signal is a signal obtained by puncturing a time-domain signal of a PUSCH of a corresponding SC-FDMA symbol.

Preferably, if the indicated reference starting position of the uplink signal indicates DL timing+transmission timing offset Y, e.g. Y=0, the UE performs CCA detection before DL timing, and immediately transmits the uplink signal at DL timing after the successful completion of CCA detection, as shown in FIG. 5. If Y=25 us, the UE starts CCA detection such as 25 us CCA at DL timing, and immediately starts to transmit the uplink signal after CCA detection is successfully completed, as shown in FIG. 12.

Preferably, a starting position of the second part of signal PUSCH is determined according to UL timing, and it is transmitted starting from a starting position of # X SC-FDMA symbol, where # X is a non-negative integer, and a special case is X=0. That is, the PUSCH starts to be transmitted from a starting position of #0 symbol of a first SC-FDMA symbol of an uplink subframe. When X>0, for example, X=1, the PUSCH starts to be transmitted from a starting position of #1 symbol of a second SC-FDMA symbol of the uplink subframe, and in the #0 symbol of the first SC-FDMA symbol of the same uplink subframe, the UE starts to transmit the first part of signal according to DL timing and the transmission timing offset Y. The UE does not transmit any signal before DL timing and the transmission timing offset Y within the #0 symbol. For example, X=2, the PUSCH starts to be transmitted from the starting position of #2 symbol of a third SC-FDMA symbol of the uplink subframe, and in #1 symbol of the second SC-FDMA symbol of the same uplink subframe, according to DL timing, the UE starts to transmit the first part of signal. The UE does not transmit any signal before DL timing and the transmission timing offset Y within the #0 symbol and the #1 symbol. It should be noted that in some special cases, the length of the first part of signal is zero, e.g. DL timing is just at the starting position of the # X SC-FDMA symbol.

Preferably, when the length M of the second part of signal PUSCH is less than the length of one subframe (14 SC-FDMAs), a PUSCH signal of length M is obtained by rate matching.

Preferably, when the length M of the second part of signal PUSCH is less than the length of one subframe (14 SC-FDMAs), the PUSCH signal of length M is obtained by puncturing.

Preferably, when the length M of the second part of signal PUSCH is less than the length of one subframe (14 SC-FDMAs), a PUSCH signal of length max(M+1, 14) SC-FDMAs is obtained by rate matching, and then the first SC-FDMA symbol is punctured according to the length of the first part of signal to obtain the first part of signal and the PUSCH signal of length M.

Preferably, DL timing is a starting position determined by the UE according to DL timing by assuming that the starting position of the uplink subframe where the uplink signal is located is #0 SC-FDMA symbol. Then, for different UEs, it is possible that SC-FDMAs where starts of DL timing are located are different. For example, for a UE that is close to the base station, a starting position of its DL timing is within the #0 SC-FDMA symbol, but for a UE that is far from the base station, a starting position of its DL timing is within #1 SC-FDMA symbol.

Preferably, if the indicated reference starting position of the uplink signal is DL timing and the transmission timing offset Y, and a transmission time determined according to DL timing and the transmission timing offset Y is later than the starting position of the # X SC-FDMA symbol, the UE still needs to start to map the PUSCH from the starting position of the # X SC-FDMA symbol.

Preferably, DL timing is a starting position determined by the UE according to DL timing by assuming that the starting position indicated by the base station in the uplink subframe where the uplink signal is located is # Y SC-FDMA symbol. For example, if the base station indicates that DL timing is used and the PUSCH starts with the #0 SC-FDMA symbol, DL timing is the starting position of DL timing in the #0 SC-FDMA symbol, i.e., the #0 SC-FDMA symbol is not an entire symbol, in which a first part of signal is within the #0 SC-FDMA symbol, and the PUSCH is transmitted starting from the #1 SC-FDMA symbol.

Preferably, DL timing is a starting position determined by the UE according to DL timing by assuming that a symbol immediately preceding the starting position indicated by the base station in the uplink subframe where the uplink signal is located is # Y−1 SC-FDMA symbol. For example, if the base station indicates that DL timing is used and the PUSCH starts with the #1 SC-FDMA symbol, then DL timing is the starting position of DL timing in the #0 SC-FDMA symbol, i.e. the #0 SC-FDMA symbol is not an entire symbol, in which the first part of signal is in the #0 SC-FDMA symbol, and the PUSCH is transmitted starting from the #1 SC-FDMA symbol.

Preferably, if the indicated reference starting position of the uplink signal is UL timing, the length of the first part of signal is zero.

Preferably, the UE performs CCA detection prior to the starting position of the uplink signal. For example, if the indicated reference starting position of the uplink signal indicates DL timing and the type of CCA detection is 25 us CCA, the UE may begin to perform CCA 25 us before DL timing. If CCA is passed, the UE starts to transmit the uplink signal at DL timing. The starting position of CCA detection may be in the same symbol with the first part of signal or may be in a preceding symbol; if the indicated reference starting position of the uplink signal indicates DL timing+ transmission timing offset Y=25 us, The UE may start to perform 25 us CCA at DL timing. If CCA is passed, the uplink signal is immediately transmitted.

Preferably, if scheduling signaling is the UL grant and cell common signaling, the UE determines frequency-domain resource mapping and/or time resource mapping of the PUSCH based on the UL grant, and determines at least the time to transmit the uplink signal and time resource mapping of the PUSCH according to cell common signaling. When information indicated by cell common signaling and information indicated by the UL grant does not match, cell common signaling indication is followed. For example, if a subframe to which cell common signaling applies is one of a plurality of uplink subframes of multi-subframe scheduling, the UL grant indicates that transmission is based on UL timing, but cell common signaling corresponding to one of the subframes indicates DL timing, then the subframe should be processed according to DL timing.

Preferably, for a UE configured with multi-subframe scheduling (the number of subframes scheduled>1), if scheduling information is the UL grant, the indicated reference starting position of the uplink signal is included in the UL grant, the indicated reference starting position of the uplink signal applies only to the first uplink subframe of multi-subframe scheduling and the other uplink subframes are determined according to UL timing. For example, if one UL grant schedules 4 uplink subframes, and the reference starting position of the uplink signal indicated in the UL grant is DL timing, then the first uplink subframe is according to DL timing and the following 3 uplink subframes are according to UL timing.

Preferably, for a UE configured with multi-subframe scheduling (the number of subframes scheduled >1), if scheduling information is the UL grant, and the reference starting position of the uplink signal indicated is included in the UL grant, the reference starting position of the uplink signal indicated applies only to the PRACH subframe, and the other uplink subframes are determined according to UL timing. For example, if one UL grant schedules 4 uplink subframes, assuming that the third uplink subframe is a PRACH subframe, and the reference starting position of the uplink signal indicated in the UL grant is DL timing, then among the 4 uplink subframes, the third uplink subframe is according to DL timing and the 3 remaining uplink subframes are according to UL timing.

Preferably, for a UE configured with multi-subframe scheduling (the number of subframes scheduled>1), if scheduling information is the UL grant, scheduling information also contains cell common control information, and cell common control information includes the reference starting position of the uplink signal indicated, then the UE determines a transmission time according to the reference starting position indicated in a subframe where cell common control information is received, and determines a transmission time according to a predefined reference starting position, e.g., UL timing, and/or according to a time indicated by the UL grant in a subframe where cell common control information is not received.

In order to better illustrate the present embodiment, several more specific examples are given below.

As shown in FIG. 5, a base station schedules UE1 and UE2 in the same uplink subframe on an unlicensed frequency band carrier C, where the UE2 is scheduled for PUSCH transmission and the UE1 is scheduled for PRACH. The UE2 is closer to the base station and the UE1 is farther away from the base station. The UE2 is single-subframe scheduling. The UL grant indicates that the reference starting position of the uplink signal is DL timing, that the PUSCH starts mapping from the #1 SC-FDMA, and that the type of LBT is CCA of 25 us. Assume that DL timing lags t'=30 us than UL timing. Assuming that the starting position of the uplink subframe is $t_0$ (the starting position of the #0 SC-FDMA), then UE2 starts CCA at $t_0+30-25$ us=$t_0+5$ us, and if CCA succeeds, the UE2 starts to transmit the first part of uplink signal at $t_0+30$ us, that is, at 30 us in the #0 SC-FDMA, until the #0 SC-FDMA ends. And then the UE2 transmits the PUSCH from #1 SC-FDMA. The UE1 transmits the PRACH according to its own DL timing, i.e., performing CCA before DL timing, and if CCA is passed, then the UE2 starts to transmit a preamble from DL timing. It is not difficult to know that the times when the UE1 and the UE2 start to transmit uplink signals are determined according to their respective DL timing. The absolute times to transmit the signals are different. The UE2 still sends an uplink signal earlier than that of the UE1. However, when the uplink signal transmitted by the UE2 reaches the UE1 after the propagation delay, it is not earlier than the transmission time of the UE1. Therefore, the uplink signal transmitted by the UE2 does not block CCA detection of the UE1.

As shown in FIG. 6, the base station schedules the UE1 and the UE2 in the same uplink subframe on the unlicensed frequency band carrier C, where the UE2 is scheduled for PUSCH transmission and the UE1 is scheduled for PRACH. The UE2 is farther from the base station, and the UE1 is closer to the base station. The UE2 is single-subframe scheduling. The UL grant indicates that the reference starting position of the uplink signal is DL timing, that the PUSCH starts mapping from #2 SC-FDMA, and that the LBT type is 25 us CCA. Assume that DL timing lags t'=120 us than UL timing. Assuming that the starting position of the uplink subframe is $t_0$ (the starting position of the #0 SC-FDMA), then the UE2 starts CCA at $t_0+120-25$ us=$t_0+95$ us, and if CCA succeeds, the UE2 starts to transmit the first part of uplink signal at $t_0+120$ us, i.e. #0 SC-FDMA is not occupied, because 95 us exceeds the length of one SC-FDMA, and the UE2 begins to transmit the first part of uplink signal at 48.1 us in the #1 SC-FDMA, until the #1 SC-FDMA ends. The UE2 transmits the PUSCH from the #2 SC-FDMA. The UE1 transmits the PRACH according to its own DL timing. That is, CCA is performed before DL timing. If CCA is passed, the UE1 starts to transmit a preamble at DL timing.

As shown in FIG. 7, the base station schedules the UE1 and the UE2 in the same uplink subframe n+2 on the unlicensed frequency band carrier C, where the UE2 is scheduled for PUSCH transmission and the UE1 is scheduled for PRACH. The UE2 is closer to the base station and the UE1 is farther away from the base station. The UE2 is multi-subframe scheduling, and the scheduled uplink subframes are n~n+3. The UL grant indicates PUSCH mapping from #1 SC-FDMA, and indicates the LBT type is 25 us CCA. Cell common information indicates the PUSCH transmission of the subframe n+2 is carried out according to DL timing, and indicates that the PUSCH of the subframe n+2 is mapped starting from #1 SC-FDMA. Then, the UE2 performs LBT before the #1 SC-FDMA symbol of the uplink subframe n, and if CCA is passed, the UE starts to transmit the PUSCH from the #1 SC-FDMA symbol according to UL timing, and continues until the subframe n+1 ends. Then, in the subframe n+2, the UE2 performs LBT before DL timing within the #1 SC-FDMA symbol, and if CCA is passed, the first part of uplink signal is transmitted according to DL timing, and the UE2 starts to transmit PUSCH from the #1 SC-FDMA symbol, and transmits PUSCH in subframe n+3.

As shown in FIG. 8, the base station schedules the UE1 and the UE2 in the same uplink subframe n on the unlicensed frequency band carrier C, where the UE2 is scheduled for PUSCH transmission and the UE1 is scheduled for PRACH. The UE2 is closer to the base station and the UE1 is farther away from the base station. The UE2 is multi-subframe scheduling, and the scheduled uplink subframes are n~n+3. The UL grant indicates that the PUSCH starts mapping from #1 SC-FDMA, that the LBT type is 25 us CCA, and that the uplink transmission time is according to DL timing. Then, the UE2 performs LBT before DL timing in #0 SC-FDMA symbol of uplink subframe n, and if CCA is passed, the UE2 starts to transmit the first part of uplink signal from inside of the #0 SC-FDMA symbol according to DL timing, starts to transmit the PUSCH from #1 SC-FDMA and continuing to uplink subframe n+3. In this example, times of transmitting uplink signals in subframes n+1~n+3 are determined according to UL timing, and there is not the first part of uplink signal. For the first subframe n of multi-subframe scheduling, the time to transmit the uplink signal is determined for transmission of the first part of uplink signal according to DL timing, and then the PUSCH is transmitted according to UL timing.

In this embodiment, the UE transmits a signal to occupy a channel and transmits a valid PUSCH from the second symbol. Although since the TA of each UE may be different, i.e. DL timing is different, a starting position to transmit a signal for each UE may be different, uplink subframes are aligned when they arrive at the base station. The base station may ignore the first symbol and start to receive the uplink data from the second symbol.

In the present embodiment, the effectiveness of the scheme of the present embodiment is analyzed mainly on the basis of a scenario where the PRACH UE and the PUSCH UE simultaneously perform scheduling in an uplink subframe. However, the present embodiment is not limited to this scenario but applicable to a scenario where different UEs transmit signals according to different timing.

Embodiment 2

FIG. 9 is a flowchart of a PRACH transmission method in Embodiment 2 of the present disclosure, and the method includes the following steps:

Step 901: a UE receives scheduling signaling, PDCCH order, and configuration signaling relating to PRACH transmission from a base station. Scheduling signaling at least includes information indicating a reference starting position of a PRACH transmitted by the UE.

Preferably, the reference starting position of the PRACH may be DL timing or UL timing of a certain reference TAG.

Preferably, the reference starting position of the PRACH may be $N_{TA}$ configured by the base station. One way to configure is configuring $N_{TA}$ explicitly in the PDCCH order, and another way is being configured semi-statically by the base station.

Further, information indicating the reference starting position of the uplink signal transmitted by the UE may further include a transmission timing offset Y. The UE may determine the reference starting position of the uplink signal by DL timing or $N_{TA}$ configured by the base station and the transmission timing offset Y.

Preferably, the reference starting position of the PRACH may be DL timing+transmission timing offset Yus, where Yus may be determined according to the length of CCA corresponding to the corresponding LBT type and/or the length of time that is set aside for aligning with other signals. It is to be noted that, in some cases, it is possible to perform transmission without performing CCA, for example, Y=16 us. As another example, if CCA is required, the length of X is relating to the length of CCA, such as Y=25, indicating that the reference starting position of the PRACH is the starting position of the scheduled subframe determined according to DL timing, and transmission of the PRACH is delayed by 25 us, as shown in FIG. 13; as another example, the length of Y is relating to the starting position of the PUSCH scheduled in the same subframe, for example, Y is the length of the first SC-FDMA symbol, indicating that the reference starting position of the PRACH is the starting position of the subframe scheduled determined according to DL timing, and that transmission of the PRACH is delayed by 1 SC-FDMA symbol; as another example, Y=0, indicating that the PRACH may be transmitted starting from DL timing. A CCA procedure before transmission is described in step 902.

Preferably, the reference starting position of the PRACH may be $N_{TA}$+transmission timing offset Yus configured by the base station, where Yus may be determined according to the length of CCA corresponding to the corresponding LBT type and/or the length of time that needs to be set aside for aligning with other signals. As another example, Y=25, indicates that the reference starting position of the PRACH is the starting position of the scheduled subframe determined according to $N_{TA}$, and transmission of the PRACH is delayed by 25 us. As another example, the length of Y is relating to the starting position of a PUSCH scheduled in the same subframe, for example Y is the length of the first SC-FDMA symbol, indicating that the reference starting position of the PRACH is the starting position of the scheduled subframe determined according to $N_{TA}$, and then transmission of the PRACH is delayed by one SC-FDMA symbol. As another example, Y=0, indicates that the reference starting position of the PRACH is the starting position of the scheduled subframe determined according to $N_{TA}$. The position of CCA is similar.

The base station configures a suitable value for Y so that CCA detection procedures of UEs that transmit a PRACH and a PUSCH in the same subframe do not interfere with each other. For example, if a UE that transmits the PUSCH in the same subframe begins to perform 25 us CCA by delaying by TA time sample points from an edge of a subframe determined according to UL timing (equivalent to performing 25 us CCA starting from DL timing), to avoid the signals of the UE that transmits the PRACH in the same subframe from affecting CCA of the UE that transmits the PUSCH, or avoid the signals of the UE that transmits the PUSCH from affecting CCA of the UE that transmits the PRACH, the base station should configure the PRACH UE to start 25 us CCA according to the DL timing, i.e., transmitting the PRACH from DL timing+25 us. Similarly, if the UE that transmits the PUSCH in the same subframe begins to transmit a signal from the second SC-FDMA symbol, the base station should configure the PRACH UE to start to transmit the signal from the second symbol. It is not difficult to see that, if there are multiple timing methods for a PUSCH, there should be multiple for a PRACH, and the base station can only solve the block problem between the PUSCH UE and the PRACH UE by selecting a suitable combination.

Preferably, a predefined plurality of values for Y may be indicated by N bits. For example, X=25 us or Y=1 symbol length may be indicated by 1 bit; for example, Y=0 us, 16 us, 25 us, or Y=1 symbol length may be indicated by 2 bits.

Preferably, signaling that indicates Y may be physical layer signaling, such as a PDCCH order, or may be cell common signaling or user group signaling; it may also be higher layer signaling such as RRC or MAC signaling; or may be predefined by the system.

Step 902: The UE starts to transmit the uplink signal at the indicated reference starting position of the PRACH according to received scheduling signaling.

Preferably, for the UE that transmits the PRACH only in one of the uplink subframes triggered, the UE performs CCA before the indicated a reference starting position of the PRACH according to received information of the reference starting position of the PRACH. If CCA is passed, the UE starts to transmit the PRACH signal from the indicated reference starting position. If the time length of the PRACH is indicated in the PDCCH order, for example whether to start with the #0 SC-FDMA symbol, the UE also needs to perform CCA from the corresponding SC-FDMA symbol according to the indicated length, and if CCA is passed, then the UE starts to transmit the PRACH signal. For example, if Y=25 is indicated in step 901 and the reference starting position is determined according to DL timing, 25 us CCA is started from DL timing, and the UE may start to transmit the PRACH at DL timing+25 us if CCA detection is passed; as another example, Y is the length of the first SC-FDMA symbol, CCA is performed before DL timing+1 SC-FDM symbol, and if CCA detection is passed, the PRACH can start to be transmitted at DL timing+1 SC-FDM symbol; as still another example, Y=0, the UE performs CCA before DL timing, and if CCA is passed, the UE can start to transmit the PRACH from DL timing. As another example, if X=25 is indicated in step 901 and the reference starting position is determined according to $N_{TA}$, if X=25, the reference starting position of the PRACH is the start of the scheduled subframe determined according to $N_{TA}$, then 25 us CCA starts from (DL timing-$N_{TA}$), and the UE can start to transmit the PRACH at DL timing-$N_{TA}$+25 us if CCA detection is passed.

Preferably, the waveform of the PRACH may be determined according to traditional art, and a front part or a rear part of the PRACH may be truncated according to the indicated starting position of the PRACH. A detailed method of truncation is not limited in the present disclosure, and it may be setting 0 in the time domain (or puncturing). For example, the length of an existing PRACH is 1 ms, and if X=25, the first 25 us time-domain signal of the PRACH is truncated and is not transmitted. It is to be noted that the truncated length of the signal may be approximately 25 us, which is an integer multiple of the number of time domain samples.

Preferably, for the UE that transmits the PRACH only in one of the plurality of uplink subframes triggered, for each uplink subframe, the UE performs CCA before the reference starting position indicated according to information of the reference starting position of the PRACH received. If CCA is passed in one of the uplink subframes, the PRACH signal starts to be transmitted from the indicated reference starting position. Or, the reference starting position of the PRACH is determined according to $N_{TA}$ indicated by the base station only for the first uplink subframe, and the PRACH is not transmitted if CCA is not passed in the first uplink subframe, and starting from a next uplink subframe, the reference starting positions of the PRACH are determined according to DL timing. If CCA is passed in one of the uplink sub-frames, the PRACH signal starts to be transmitted from the indicated reference starting position.

Embodiment 3

Step 1001: a UE receives first scheduling signaling and second scheduling signaling in which first scheduling signaling includes at least resource information of an uplink signal, and second scheduling signaling includes at least LBT information indicating transmission of the uplink signal.

Step 1002: The UE performs LBT in the corresponding uplink subframe according to LBT information indicated by second scheduling signaling according to received scheduling signaling, and if LBT is passed, the UE transmits the uplink signal according to resource information indicated by first scheduling signaling.

Preferably, second scheduling signaling is cell common signaling, such as cell common DCI.

Preferably, second scheduling signaling may include an indication of a target uplink subframe. For example, an indication of the $K^{th}$ uplink subframe after the downlink subframe in which second scheduling signaling is received may be indicated. For example, 2 bits indicate that the first, second, third, or fourth subframe after the current downlink subframe is the target uplink subframe.

Preferably, second scheduling signaling may be used to indicate LBT information of the PUSCH and may also be used to indicate LBT information of an SRS.

Preferably, the SRS is an SRS that is transmitted without a PUSCH in the same subframe.

Preferably, second scheduling signaling may be distinguished, by the number of bits, as whether to indicate LBT information of a PUSCH or indicate LBT information of an SRS, for example, a 1-bit explicit indication. Second scheduling signaling may also be distinguished using different radio network temporary identity (RNTIs) as whether to indicate LBT information of the PUSCH or indicate LBT information of the SRS.

Preferably, second scheduling signaling, if used to indicate LBT information of the SRS, includes at least the LBT type of the SRS, such as no LBT, 25 us LBT, and Cat 4 LBT.

Preferably, if second scheduling signaling is used to indicate LBS information of the SRS, then it includes at least a contention window (CW) size of the SRS LBT or a backoff (BO) counter.

Preferably, second scheduling signaling does not have an indication for distinguishing from indicating a PUSCH or an SRS. The UE determines whether scheduling signaling is applicable to the PUSCH or the SRS according to whether the PUSCH or the SRS is to be transmitted in the target uplink subframe of second scheduling signaling.

Preferably, second scheduling signaling may include an indication indicating the reference starting position of the uplink signal, as shown in the first embodiment of the present disclosure.

Preferably, second scheduling signaling includes at least the LBT type and/or the CW size and/or the BO size of the PUSCH if it is used to indicate LBT information of the PUSCH.

Preferably, second scheduling signaling includes at least start information of the PUSCH if it is used to indicate LBT information of the PUSCH.

Preferably, second scheduling signaling includes at least a reference starting position of the uplink signal if it is used to indicate LBT information of the PUSCH.

Advantageously, second scheduling signaling may indicate whether the target uplink subframe is an SRS subframe. For example, if the uplink subframe is indicated as an SRS subframe, and the UE is not triggered to transmit an SRS in the uplink subframe, then the UE transmits a signal on the SRS symbol in a predefined manner, for example, transmitting a signal to occupy a channel on combs which are predefined not for SRS transmission. If it is indicated that the uplink subframe is not an SRS subframe and the UE is not triggered to transmit an SRS in the uplink subframe, the UP may map to the last symbol when transmitting the PUSCH.

Preferably, if the UE receives only first scheduling signaling, but not second scheduling signaling, then the UE does not transmit any signal.

Preferably, if the UE receives only first scheduling signaling, but not second scheduling signaling, the UE performs LBT according to a predefined LBT assumption and attempts to transmit the signal. For example, if the UE is to transmit an SRS but has not received second scheduled signaling, the UE performs LBT according to Cat 4 and performs LBT according to the maximum CW or the maximum BO.

Preferably, if first scheduling signaling indicates that the PUSCH is mapped to the ending position of the last symbol of the subframe and that in the subframe, a A-SRS request bit is in an A-SRS transmission requesting state, then the UE interprets that the subframe is an A-SRS subframe, but the UE does not transmit the A-SRS in the subframe, the PUSCH of the UE is mapped to the ending position of the penultimate symbol, and the UE transmits a signal to occupy a channel on a resource pre-defined by the last symbol, for example, a transmission comb and/or a cyclic shift configured by the base station. This resource is not used for SRS transmission. Therefore, the UE transmits the signal to occupy the channel on this resource without affecting the SRSs transmitted by other UEs.

Corresponding to the embodiments described above, the present disclosure provides user equipments respectively, which will be described below with reference to the accompanying drawings.

A structure of the UE is as shown in FIG. 11, and the UE includes: a first receiving module and a first uplink signal transmission module, in which:

the first receiving module is to receive scheduling signaling which at least includes information indicating a reference starting position of an uplink signal transmitted by the UE; and the first uplink signal transmission module is to start to transmit the uplink signal on a corresponding uplink carrier at the indicated reference starting position of the uplink signal according to the received scheduling signaling. Before the uplink signal is transmitted, if CCA detection is required, CCA detection is performed. If CCA detection is passed, the uplink signal is transmitted, or otherwise the uplink signal will not be transmitted.

The invention claimed is:

1. A method performed by a terminal in a communication system supporting a licensed assisted access (LAA), the method comprising:
   receiving, from a base station, control information for an uplink scheduling, the control information including information for a reference starting position of a physical uplink shared channel (PUSCH); and
   transmitting, to the base station, data based on the information for the reference starting position of the PUSCH,
   wherein the information for the reference starting position of the PUSCH indicates a starting symbol and a statin position within the starting symbol.

2. The method of claim 1, wherein the starting position within the starting symbol includes a timing offset.

3. The method of claim 1, wherein the starting position within the starting symbol includes a timing offset and a timing advance (TA).

4. The method of claim 1, wherein the control information is received on a user equipment (UE)-specific signalling.

5. The method of claim 1, wherein a bit length of the information for the reference starting position of the PUSCH is 2 bits.

6. A method performed by a base station in a communication system supporting a licensed assisted access (LAA), the method comprising:
   transmitting, to a terminal, control information for an uplink scheduling, the control information including information for a reference starting position of a physical uplink shared channel (PUSCH); and
   receiving, from the terminal, data based on the information for the reference starting position of the PUSCH,
   wherein the information for the reference starting position of the PUSCH indicates a starting symbol and a starting position within the starting symbol.

7. The method of claim 6, wherein the starting position within the starting symbol includes a timing offset.

8. The method of claim 6, wherein the starting position within the starting symbol includes a timing offset and a timing advance (TA).

9. The method of claim 6, wherein the control information is received on a user equipment (UE)-specific signalling.

10. The method of claim 6, wherein a bit length of the information for the reference starting position of the PUSCH is 2 bits.

11. The base station of claim 6, the starting position within the starting symbol includes a timing offset and a timing advance (TA).

12. A terminal in a communication system supporting a licensed assisted access (LAA), the terminal comprising:
   a transceiver; and
   a processor configured to:
   receive, from a base station via the transceiver, control information for an uplink scheduling, the control information including information for a reference starting position of a physical uplink shared channel (PUSCH), and
   transmit, to the base station via the transceiver, data based on the information for the reference starting position of the PUSCH, wherein the information for the reference starting position of the PUSCH indicates a staring symbol and a starting position within the starting symbol.

13. The terminal of claim 12, wherein the starting position within the starting symbol includes a timing offset.

14. The terminal of claim 12, wherein the starting position within the starting symbol includes a a timing offset and a timing advance (TA).

15. The terminal of claim 12, wherein the control information is received on a user equipment (UE)-specific signalling.

16. The terminal of claim 12, wherein a bit length of the information for the reference starting position of the PUSCH is 2 bits.

17. A base station in a communication system supporting a licensed assisted access (LAA), the base station comprising:
   a transceiver; and
   a processor configured to:
      transmit, to a terminal via the transceiver, control information for an uplink scheduling, the control information including information for a reference starting position of a physical uplink shared channel (PUSCH), and
      receive, from the terminal via the transceiver, data based on the information for the reference starting position of the PUSCH,
   wherein the information for the reference starting position of the PUSCH indicates a starting symbol and a starting position within the starting symbol.

18. The base station of claim 17, wherein the starting position within the starting, symbol includes a timing offset.

19. The base station of claim 17, wherein the control information is received on a user equipment (UE)-specific signalling.

20. The base station of claim 17, wherein a bit length of the information for the reference starting position of the PUSCH is 2 bits.

* * * * *

UNITED STATES PATENT AND TRADEMARK OFFICE
CERTIFICATE OF CORRECTION

| | |
|---|---|
| PATENT NO. | : 11,089,583 B2 |
| APPLICATION NO. | : 16/301368 |
| DATED | : August 10, 2021 |
| INVENTOR(S) | : Shichang Zhang et al. |

It is certified that error appears in the above-identified patent and that said Letters Patent is hereby corrected as shown below:

In the Claims

In Claim 1, at Column 16, Line 19:
"a statin" should be -- a starting --.

In Claim 12, at Column 17, Line 2:
"a staring symbol" should be -- a starting symbol --.

In Claim 14, at Column 17, Line 7:
"a a timing offset" should be -- a timing offset --.

Signed and Sealed this
Twenty-second Day of November, 2022

Katherine Kelly Vidal
Director of the United States Patent and Trademark Office